(12) United States Patent
Kannan et al.

(10) Patent No.: US 11,034,604 B2
(45) Date of Patent: Jun. 15, 2021

(54) SAGD SALINE WATER SYSTEM OPTIMIZATION

(71) Applicant: ConocoPhillips Company, Houston, TX (US)

(72) Inventors: Murugavel Kannan, Houston, TX (US); Ramesh Sharma, Houston, TX (US)

(73) Assignee: CONOCOPHILLIPS COMPANY, Houston, TX (US)

(*) Notice: Subject to any disclaimer, the term of this patent is extended or adjusted under 35 U.S.C. 154(b) by 245 days.

(21) Appl. No.: 16/156,957

(22) Filed: Oct. 10, 2018

(65) Prior Publication Data

US 2019/0106346 A1 Apr. 11, 2019

Related U.S. Application Data

(60) Provisional application No. 62/570,799, filed on Oct. 11, 2017.

(51) Int. Cl.
| | |
|---|---|
| C02F 9/00 | (2006.01) |
| E21B 21/06 | (2006.01) |
| E21B 43/34 | (2006.01) |
| E21B 43/24 | (2006.01) |
| E21B 43/16 | (2006.01) |
| C02F 5/06 | (2006.01) |
| C02F 1/42 | (2006.01) |
| C02F 103/10 | (2006.01) |
| C02F 1/00 | (2006.01) |
| C02F 1/56 | (2006.01) |

(52) U.S. Cl.
CPC ............... *C02F 9/00* (2013.01); *C02F 1/42* (2013.01); *C02F 5/06* (2013.01); *E21B 21/063* (2013.01); *E21B 21/068* (2013.01); *E21B 43/168* (2013.01); *E21B 43/24* (2013.01); *E21B 43/34* (2013.01); *C02F 1/004* (2013.01); *C02F 1/56* (2013.01); *C02F 2001/425* (2013.01); *C02F 2103/10* (2013.01); *E21B 43/2406* (2013.01); *E21B 43/2408* (2013.01)

(58) Field of Classification Search
None
See application file for complete search history.

(56) References Cited

U.S. PATENT DOCUMENTS

| | | | | |
|---|---|---|---|---|
| 4,425,227 A * | 1/1984 | Smith | ....................... | B03B 9/02 208/390 |
| 8,353,343 B2 | 1/2013 | Seaba et al. | | |
| 2013/0075098 A1* | 3/2013 | Janjua | ................. | E21B 43/2406 166/303 |

(Continued)

OTHER PUBLICATIONS

Butler, R. M., "Thermal Recovery of Oil & Bitumen", Chapter 7: "Steam-Assisted Gravity Drainage", Prentice Hall, (1991).

*Primary Examiner* — Clare M Perrin
(74) *Attorney, Agent, or Firm* — Boulware & Valoir (57) ABSTRACT

A new water treatment system for SAGD operations is disclosed. Instead of treating both produced water and recycled water using warm lime softening systems, the recycled water is combined with saline water in a cold lime softening system. This results in slightly warmed reactions that require less chemicals during the lime softening process while also allowing for larger volumes of treated produced water to be generated by the warm lime softening system.

20 Claims, 5 Drawing Sheets

(56) References Cited

U.S. PATENT DOCUMENTS

| | | | |
|---|---|---|---|
| 2015/0259232 A1* | 9/2015 | Xia | C02F 9/00 |
| | | | 166/267 |
| 2016/0102006 A1* | 4/2016 | Blumenschein | C02F 1/04 |
| | | | 210/638 |
| 2016/0244346 A1* | 8/2016 | Bernar | C02F 1/02 |
| 2019/0084848 A1 | 3/2019 | Osness et al. | |

* cited by examiner

SAGD SALINE WATER SYSTEM OPTIMIZATION

PRIOR RELATED APPLICATIONS

This application claims priority to U.S. Ser. No. 62/570,799, filed Oct. 11, 2017, incorporated by reference in its entirety for all purposes.

FEDERALLY SPONSORED RESEARCH STATEMENT

Not applicable.

REFERENCE TO MICROFICHE APPENDIX

Not applicable.

FIELD OF THE DISCLOSURE

The disclosure relates generally to SAGD operations, and specifically to improved water treatment systems for SAGD.

BACKGROUND OF THE DISCLOSURE

Bitumen is a thick, sticky form of crude oil, so heavy and viscous (thick) that it will not flow unless heated or diluted with lighter hydrocarbons. Canada and Venezuela have some of the largest deposits of bitumen. Unfortunately, the bitumen in these reservoirs is especially difficult to recover because it is wrapped around sand and clay, forming what is called 'oil sands.' Furthermore, the crude bitumen contained in the Canadian oil sands is described as existing in the semi-solid or solid phase in natural deposits.

Conventional approaches to recovering heavy oils such as bitumen often focus on lowering the viscosity through the addition of heat. Commonly used in situ extraction thermal recovery techniques include a number of reservoir heating methods, such as steam flooding or cyclic steam stimulation and Steam Assisted Gravity Drainage (SAGD).

Figure 1:
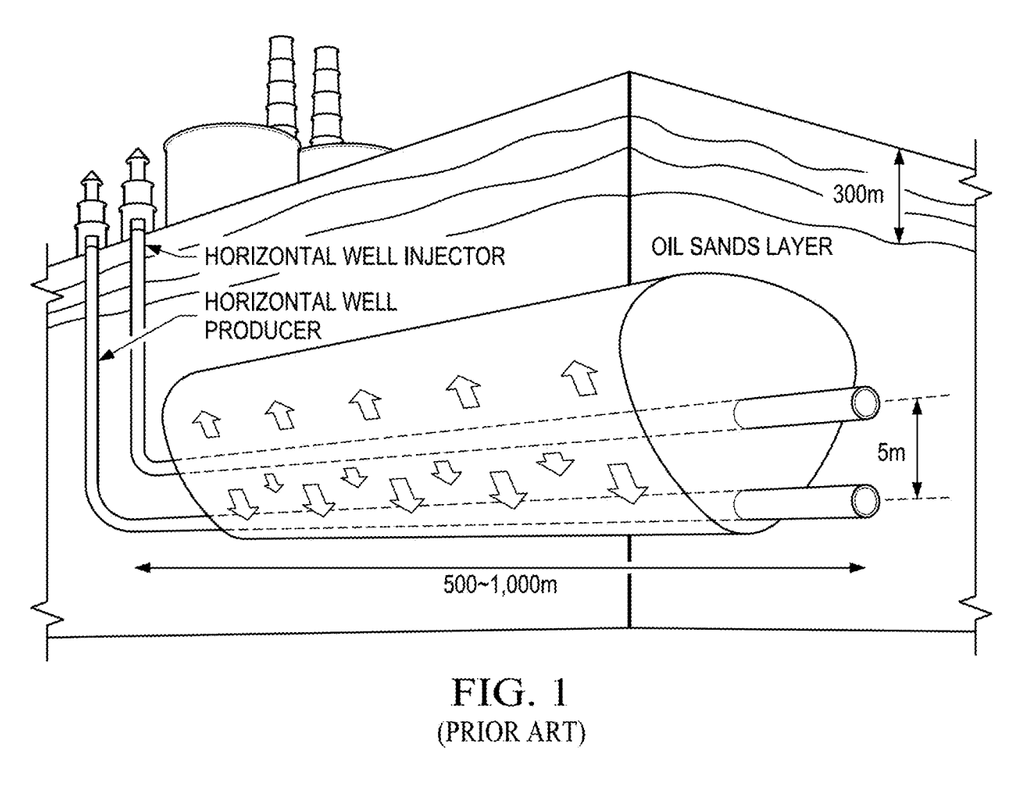
FIG. 1 is a schematic of a typical SAGD site (prior art).

SAGD is the most extensively used technique for in situ recovery of bitumen resources in the McMurray Formation in the Alberta oil sands and other reservoirs containing viscous hydrocarbons. FIG. 1 displays the typical SAGD system. In SAGD, two horizontal wells are vertically spaced by 4 to 10 meters (m). The production well is located near the bottom of the pay and the steam injection well is located directly above and parallel to the production well. In SAGD, steam, generated by, for example a Once-Through Steam Generator (OTSG), is injected continuously into the injection well, where it rises in the reservoir and forms a steam chamber. The heat from the steam reduces the oil's viscosity, thus enabling it to flow down to the production well and be transported to the surface via natural drive, pumps or lift gas.

Although quite successful, SAGD does require significant amounts of water in order to generate a barrel of oil. Some estimates provide that 1 barrel of oil from the Athabasca oil sands requires on average 2 to 3 barrels of water, although with recycling the total amount can be reduced to 0.5 barrel. In addition to using a precious resource, additional costs are added to convert those barrels of water to high quality steam for downhole injection, and then again to clean the water for reuse. Therefore, any technology that can reduce water or steam consumption has the potential to have significant positive environmental and cost impacts.

One approach to reducing water consumption is to recycle produced water and blowdown from the steam generators. Produced water is water mixed with the hydrocarbons produced from the reservoir and is typically utilized for producing steam and being re-injected downhole in a closed-loop system because sources of additional (surface) water may be severely restricted due to legal regulations, or as a result of water being in scarce supply at surface. Presently, the general guideline on water recovery is to recycle 90% of the produced water as boiler feedwater.

Before it can be used as boiler feedwater, produced water needs to be de-oiled and further purified because it typically contains common impurities including silica, alkali, and alkali earth salts, as well as hydrocarbons, including but not limited to asphaltenes, naphthenic acids, resins, phenols, amines and aromatics ("Fouling Organics"). Such contaminants have a very detrimental effect on boilers, because they tend to coat or form compounds on the interior of heating tubes within such boilers, thereby reducing the ability of the boiler to heat water efficiently in such boiler tubes or lead to hot spots and tube failures.

OTSG blowdown is the remaining waste solution after produced water has been treated and reheated, and includes the 20-30% of the OTSG feedwater not converted to steam. If such water is disposed, the SAGD water utilization system is not a closed-loop system, and water is being wasted. Alternatively, if such boiler blowdown water is recycled back to the boiler inlet, impurities and fouling organics in the boiler feedwater become concentrated, eventually resulting in boiler fouling due to the concentration of impurities. Thus, this recycled stream is often treated and used to further reduce the consumption of fresh water as boiler feedwater.

The most common system for treating the produced water, and other recycled water streams such as filter backwash, weak acid cation (WAC) regeneration waste, and OTSG blowdown, is lime softener followed by ion exchange. The concept of lime softening is to remove "hardness-causing" ions, e.g. calcium and magnesium, by converting them to particles that precipitate. Thus, lime softening water treatments consists of three separate sections: reaction (which converts hardness ions to a low solubility salts), precipitation (which happens after oversaturation of water with low soluble salts), and the sedimentation of generated particles. The filtration and ion exchange further removes suspended and dissolved ions and softens the water.

There are three main types of lime softening systems: Cold Lime Softener (CLS) (operating temperatures ~15-60° C.), Warm Lime Softener (WLS) (operating temperatures ~60-85° C.), and Hot Lime Softener (HLS) (operating temperatures ~90-105° C.). WLS and HLS are most common in industrial water treatments. HLS is very popular for treating produced water, and make-up water for high-pressure boilers, which need very low hardness feedwater.

HLS and WLS are often used in oil extraction facilities to soften the produced water, make-up water, and/or other recycled water streams to prepare boiler feedwater for Once Through Steam Generators (OTSG). Both lime softening systems treat by adding heated limewater to reduce hardness and alkalinity, and magnesium oxide to reduce the silica content of the boiler feedwater. The water is then subsequently treated with a weak or strong acid cation exchange to further soften the water, and filters to remove precipitated solids.

However, there still exists a need for further improvements in the water treatment system. There are economic and environmental incentives for improving efficiencies in steam generation in the bitumen and heavy oil industry and maintaining a closed-loop system, and even incremental improvements in the oil field water treatment system can mean the difference between cost effective production and reserves that are uneconomical to produce.

SUMMARY OF THE DISCLOSURE

Described herein is a system for improving water treatment operations for SAGD.

In particular, a Cold Lime Softener (CLS) system for treatment of saline make-up water is modified to mix warm disposal blowdown water with the CLS stream to improve performance and capacity of the CLS system and to improve water quality of the saline water. A warm or hot lime softener unit is still utilized for treating the produced water. Other water sources that are unfit for consumption or irrigation can also be use in the CLS.

The present system reduces SAGD costs by increasing the effectiveness of saline make-up water CLS system and treating water streams generated by the SAGD facility equipment (e.g. WAC regeneration, After-Filter Backwash, centrifuge centrate, OTSG blowdown, and other process streams) in the CLS, thereby freeing-up the capacity in produced water treatment system.

The addition of the various generated water streams to the CLS have a synergistic effect: the warm generated water raises the operating temperature of CLS to 30-35° C. Increases in the CLS operating temperature reduces chemical consumption, as well as lowers the effluent hardness leaving the CLS system, compared to the basic operating parameters. This results in better operating efficiencies of downstream equipment (after filters, and WAC resin regeneration), and reduced chemical costs.

In addition, the pre-heating also reduces the heat duty of the heat exchangers, which are employed prior to secondary WAC to raise the make-up water temperature to match with the rest of produced water stream. This reduces fouling and overall operation of heat exchangers.

Some water will always be lost in the SAGD operation. However, treating and reusing the blowdown and generated streams means less outside water is needed. The present method increases the volume of water that is re-used by feeding the untreated water stream into separate water treatment units. By reconfiguring the typical SAGD water treatment system to allow the CLS to treat the generated water streams (e.g. blowdown water, filter backwash, WAC resin regeneration) together with the saline or make-up water, more treatment capacity is shifted from the warm or hot lime softener unit to the cold lime softener unit. This frees up the capacity of the warmer lime softener to produce larger volumes of treated produced water. The CLS, which typically runs below capacity and is less efficient at lower operating temperatures, is able to accommodate the increase in water to be treated without sacrificing quality. Further, by combining the warmer blowdown or other generated water streams with the CLS, the cleaning temperature is raised to facilitate the use of less chemicals.

Thus, the benefits of the proposed system includes:
- freed-up capacity of warm or hot lime softener unit, allowing more produced water to be treated.
- increased utilization of a cheaper water source.
- improved closed loop.
- reduced the amount of chemicals needed in the CLS process as well as downstream WAC system due to use of the warmer produced water streams.
- more efficient water treatment.

Another benefit of the proposed system is that minimal changes are required to water treatment systems already online at SAGD pads. In most systems, a CLS is already present on-site. Thus, a re-routing of the blowdown streams and other recyclable water streams to the CLS and adding an equalization tank is all that is needed for the present system. The warm or hot lime softener system is not modified except for the re-routing of the recycle water line to the CLS.

An equalization tank is needed to collect the generated water streams and saline makeup water stream and to mix the stream together. Most equalization tanks will have 20-100 minute retention time and the streams will be completely mixed by an impeller to homogenize stream composition as well as temperature. The equalization tank can also have a cone bottom to allow removal of any solid precipitate in the tank. The solid precipitates will naturally settle to the bottom and will not block the lines entering or exiting the equalization tank. However, other tank designs could be used.

Finally, any steam generator, such as an OTSG or drum boiler can be utilized with the water produced by the water treatment system. Thus, no changes are needed to the steam generators to accommodate the changes in volumes of water from each softener system.

In other water treatment systems having multiple warm or hot lime softener units, one of the units can easily be switched to a cold lime softener unit and the generated water streams can be re-routed per the proposed design.

The present system is described as feeding warm blowdown from the steam generators to the CLS. However, other waste streams can also be included. For instance, lime softening systems often have resin regeneration streams that can be mixed with the blowdown and treated alongside the saline water in the CLS unit. Streams from various filters can also be treated using the presently described system.

The increase in temperature and pH experienced by the CLS unit during treatment of the warm generated water streams is expected to decrease the required amount of chemicals by at least 10-30%. This reduction is due to the increase in reaction rate of the limewater and hardness ions at a higher temperature. Further, the increase in pH provided by the blowdown water stream reduces the need to add caustic or lime chemicals in the CLS unit.

In addition to the limewater, coagulant and flocculants are added per traditional CLS operation to assist with precipitation. However, no special chemicals that are not usually found in CLS operations are needed.

This summary is provided to introduce a selection of concepts that are further described below in the detailed description. This summary is not intended to identify key or essential features of the claimed subject matter, nor is it intended to be used as an aid in limiting the scope of the claimed subject matter.

The term "untreated water" encompasses all water used for SAGD that has not undergone significant pretreatment to e.g., remove dissolved solids before being heated and includes sources such as feedwater, brackish water and water recovered from a production fluid.

As used herein, "saline water" refers to any water source having a high salinity. Saline water is often used as a makeup water to replace water lost in the reservoir.

The term "produced water" is used herein to describe water that is produced as a byproduct along with oil and gas. This water is separated from the produced hydrocarbons and usually pretreated and mixed with other streams of water before re-use in steam generation or disposal.

The term "generated water" is used to described water streams that are generated by equipment during the SAGD process, such as the steam generators, filters, and ion exchangers, but specifically exclude produced water. Exemplary generated water streams include, but are not limited to, weak acid cation exchange regeneration, after-filter backwash, centrifuge centrate, OTSG blowdown, and other process streams. These streams are also referred to as recycled streams as they are being reused for steam generation.

The term "WAC regeneration stream" is used herein to describe the waste stream generated during the resin regeneration in a WAC ion exchanger. The basic purpose of resin regeneration is to restore the exhausted resin back to its proper ionic form for service.

As used herein, "closed loop" refers to not relying on water sources outside of the system, or at least minimally so. While a SAGD operation can never truly be a 100% closed loop, efficient use of water can bring the system into a pseudo-close loop status where the majority of water is reused with little to no waste. Some disposal water still goes to the disposal, which is purged from the plant. If zero disposal water is purged, then material will build up in the plant and foul the system.

As used herein, a "water tube drum boiler" is a drum based steam generator having 1-4 drums, which function to collect the steam generated in the water tubes and acts as a phase-separator for the steam/water mixture. Liquid water is routed back through the boiler.

A "fire tube drum boiler" has the hot gas in the tube, instead of the liquid, but this older technology is less commonly used today.

As used herein, a "Once-Through Steam Generator" or "OTSG" is a specialized type of heat recovery steam generator without boiler drums. In this design, the inlet feedwater follows a continuous path without separate segmented sections for economizers, evaporators, and superheaters. This provides a high degree of flexibility as the sections are allowed to grow or contract based on the heat load being received from the gas turbine. The absence of drums allows for quick changes in steam production and fewer variables to control, and is ideal for cycling and base load operation.

The OTSG without a superheating section typically produces a "wet" steam that consists of about 70-80% steam and 20-30% water. The water that is separated from the steam is known as "blowdown water." It typically has concentrated levels of total organic carbon ("TOC") and thus is quite dirty. The term "blowdown" is used herein to describe this water that is intentionally wasted from a steam generator to avoid concentration of impurities during continuing evaporation of steam.

As used herein, the term "cold lime softener unit" includes the cold lime softener system and subsequent ion exchange and filter systems. Similarly, the term "warm lime softener unit" includes the warm lime softener system and subsequent ion exchange and filter systems and the term "hot lime softener unit" includes the hot lime softener system and subsequent ion exchange and filter systems.

Any filter or filter system or ion exchanger commonly used in SAGD water treatment can be used with the current invention.

Preferably, the ion exchanger utilizes a weak acid cation. Weak acid cation ion exchangers derive their exchange activity from a carboxylic group (—COOH). Weak acid cation resins are used primarily for softening and dealkalization of high-hardness, high-alkalinity waters such as those encountered in SAGD operations.

As used herein, the term "softening chemicals" refers to the chemicals injected into the lime softening vessels. In addition to the limewater, other additives such as coagulants or flocculants are also injected to improve separation of the precipitated hardness. The coagulants and flocculants can be inorganic or organic.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| CLS | Cold lime softener |
| WLS | Warm lime softener |
| HLS | Hot lime Softener |
| OTSG | Once through steam generator |
| AF | After filter |
| WAC | Weak Acid Cation |
| BD | Steam generator blowdown |
| TOC | Total organic carbon |
| NTU | Nephelometric Turbidity Unit |
| polyDADMAC | Polydiallyldimethylammonium chloride |
| TSS | Total suspended solids |

DESCRIPTION OF EMBODIMENTS OF THE DISCLOSURE

The invention provides a novel water treatment system for SAGD operations.

Specifically, waste water streams generated by SAGD equipment (e.g. backwash, resin regeneration, centrifuge centrate) and OTSG blowdown water streams are combined with a saline makeup water stream and treated with cold lime softener unit instead of the typical warm lime softener system. The change allows for an increase in volume of better quality water from the WLS, a reduction in the amount of chemicals needed for the CLS system, and an improved closed loop SAGD operation.

The present methods includes any of the following embodiments in any combination(s) of one or more thereof:

A water treatment system for SAGD comprising a saline water stream; a fresh water stream; a produced water stream; a warm lime softener treatment unit comprising a warm lime softener system fluidly connected to an ion exchange system, which is fluidly connected to at least one filter, wherein the warm lime softener unit has an inlet for receiving and treating the produced water stream, a chemical injection inlet for receiving softening chemicals, a first outlet for a treated produced water stream, and a second outlet for a first regeneration stream; a cold lime softener treatment unit comprising a cold lime softener system fluidly connected to an ion exchange system, which is fluidly connected to at least one filter, the cold lime softener unit having a cold lime softener inlet, a chemical injection inlet for receiving softening chemicals, a first outlet for a first treated water stream, and a second outlet for a second regeneration stream; one or more steam generators fluidly connected to the first outlet of the warm lime softener treatment unit and the first outlet of the cold lime softener treatment unit such that the steam generators receive and heat the first treated water streams and the treated produced water stream, the steam generators having a first outlet for steam and a second outlet for a blowdown stream; and, a vessel fluidly connected to the second outlet of the warm lime softener treatment unit, the second outlet of the cold lime softener treatment unit, and second outlet of the steam generators, such that vessel mixes the saline water stream, the fresh water stream, the first regeneration stream, the second regeneration stream, and the blowdown stream to form a stream to be treated, the vessel in fluid communication with the cold lime softener inlet, wherein the stream to be treated is received by the cold lime softener inlet in the cold lime softener treatment unit for treatment by the cold lime softener treatment unit.

In any of the above-described systems, the stream to be treated by the cold lime softening unit has a constant, known ratio of saline water stream, fresh water, first regeneration stream, second regeneration stream, and/or blowdown stream.

In any of the above-described systems, the blowdown stream in the stream to be treated raises the temperature and pH of the cold lime softener treatment unit. This increase in temperature can be between 5-50° C. or 30° C. The raise in temperature and pH in any of the above systems reduces the amount of softening chemicals required for treatment by the cold lime softener treatment unit by at least 20%. However, even with the raise in temperature, the CLS is still operating at temperatures below that of a WLS, which operates at 60-85° C.

In any of the above-described systems, the ion exchange system comprises a weak acid cation exchanger.

A method for treating feedwater for a steam generator, comprising treating a produced water stream with a warm lime softener treatment unit to make a treated produced water; mixing a saline water, a makeup water and a steam generator blowdown stream in a vessel to form a combined stream; treating the combined stream with a cold limewater stream in a cold lime softener treatment unit, wherein the steam generator blowdown stream increases the operating temperature and pH of the combined stream resulting in less cold limewater being used to make a treated combined stream; combining the treated produced water with the treated combined stream to form a feedwater for a steam generator.

An improved water treatment method for SAGD, wherein the water treatment method comprises treating produced water, fresh water, blowdown water, and regeneration water with a warm lime softener treatment unit to produced a first treated water stream, treating saline water with a cold lime softener treatment unit to produce a second treated water stream, generating steam from the first and second treated water streams with at least one steam generator, the improvement comprising feeding the fresh water, the blowdown water, the regeneration water, and the saline water to a vessel and mixing to form a first mixture, and treating the first mixture in the cold lime softener treatment unit, wherein the warm lime softener treatment unit only treats the produced water.

A method for treating saline water for SAGD operations, comprising mixing a saline water stream with a warm steam generator blowdown stream, a warm lime softener regeneration stream, a cold lime softener regeneration stream and/or a fresh water stream in a vessel at a known and constant ratio to form a mixture; introducing the mixture into a cold lime softener unit, the unit comprising a cold lime softener, an ion exchanger, and at least one filter in fluid communication, wherein the cold lime softener unit has an outlet for a regeneration stream, an inlet for the mixture, and an inlet for softening chemicals; mixing the mixture with the softening chemicals in the cold lime softener to form a softened mixture, wherein the operation temperature and pH of the cold lime softener is raised by the warm steam generator blowdown stream, wherein the increase in temperature and pH increases the reaction rate of the softening chemicals such that the amount of softening chemicals needed for treatment is reduced as compared to the same system without said increase in temperature and pH; treating the softened mixture with an ion exchanger and at least one filter to form a treated saline water stream; feeding the treated saline water stream into a steam generator.

Any of the above methods, wherein the step of treating the water streams with cold lime softener treatment unit comprises using an organic coagulant. Any of the above methods, wherein the softening chemicals comprises an organic coagulant. One exemplary organic coagulant is a poly(diallyldimethylammonium chloride).

Any of the above methods, further comprising the steps of generating steam from the feedwater, injecting steam in an oil well, producing oil and condensed steam, separating out the condensed steam to form produced water, and re-treating the produced water.

Any of the above methods, where the first mixture has a predetermined ratio of fresh, blowdown, regeneration, and saline water that is maintained.

Any of the above methods, wherein a warm lime softener treatment unit treats larger volumes of produced water.

Any of the above methods, wherein the warm steam generator blowdown stream comes from a steam generator.

Any of the above methods, wherein the cold lime softener regeneration stream comes from the regeneration stream outlet of a cold lime softener unit.

Any of the above methods, wherein the ion exchanger comprises a weak acid cation exchange mechanism.

Any of the above methods, wherein the cold lime softener experiences an increase in temperature and reduction of pH by about 20%.

Any of the above methods, wherein the treated saline water stream is mixed with a treated produced water stream before being fed into said steam generator.

Any of the above methods, wherein the addition of the steam generator blowdown stream to the stream to be treated raises the temperature and pH of the cold lime softener treatment unit and results in a reduction of softening chemicals, as compared to cold lime softener treatment units that do not treat blowdown streams The present invention is exemplified with respect to water treatment systems for SAGD, steam flooding or cyclic steam stimulation. However, this is exemplary only, and the invention can be broadly applied to any industrial water and/or wastewater treatment facility, especially for refining and petrochemical applications. The following examples are intended to be illustrative only, and not unduly limit the scope of the appended claims.

To minimize the use of fresh water and decrease the cost of SAGD and other steam based enhanced oil recovery operations, saline water is often used as a makeup stream for steam generation. Cold lime softening followed by ion exchange and filtering is use to treat the saline water to reduce the amount of contaminants introduced into the steam generators.

Existing saline water treatment systems are designed for producing 14,000 $m^3$/day. However, the saline pipeline system and the saline water resource can supply only around 8000 $m^3$/day on a continuous basis. As such, various opportunities were investigated to utilize the actual system capacity to reduce water treatment costs.

The presently disclosed system utilizes the full capacity of the saline water treatment system by mixing the saline water stream with the warm blowdown stream from steam generators as well as regeneration streams from the water treatment units.

Currently, the cold lime softener unit that treats the saline water operates at 5° C. However, this low temperature operation results in higher chemical dosages, in addition to producing water quality and performance problems. By mixing the saline water with warm blowdown water, the temperature and pH of the treatment system increases. This results in less chemicals being needed for the lime softener process, while improving water quality. As such, more water is generated for use in steam generators without increasing fouling in the steam generators. Further, more water in the form of the blowdown stream can be recycled and re-used in SAGD operations.

FIG. 1 displays a typical prior art configuration of a water treatment operation used for SAGD operations. The operation comprises a CLS unit (1001), a WLS unit (1003), an equalization tank for mixing various recycled streams (1002), a steam generator (1004) for heating water and a blowdown evaporator (1005).

The saline water is added to and treated by the CLS unit (1001). In addition to the CLS, this unit (1001) also includes an after filter (AF) to remove precipitates and a weak acid cation exchanger (WAC). Thus, the saline water is treated by the CLS first, then the after filter, before further softening with the weak acid cation exchanger. The treated saline water (1b) is then sent to the steam generator while the After Filter+weak acid cation exchanger regeneration stream (1a) from the CLS water treatment plant (1001) is sent to a vessel (1002) that collects recycle streams from various systems in the water treatment operation.

Like the CLS, the WLS (1003) also contains weak acid cation exchanger and after filter units. Here, fresh water and produced water are mixed with the combined recycled water, treated using warm lime softener and ion exchange mechanism before the treated stream (3b) is sent to the steam generator (1004).

The steam (4b) from the stream generator (1004) is sent to the blowdown evaporator (1005) to remove silica and other contaminants before it is sent to the well. The contaminant stream from the evaporator (1005) is disposed of (1006) in a wastewater well.

As described above and seen in FIG. 1, the weak acid cation exchanger regeneration stream and saline filter backwash (1a), the recycle blowdown (4A) stream from the steam generator (1004), and the after filter backwash and weak acid cation exchanger regeneration streams (3a) from the WLS water treatment plant (1003) are all combined in the mixing vessel (1002) to form a combined recycle stream (2). The combined recycle stream (2) is then sent to the WLS (1003) for cleanup and heating by the steam generator (1004).

The water treatment operations in FIG. 1 suffer from many challenges. First, there are excessive amounts of water recycle and disposal volumes. Second, all of the recycle water is currently treated in the WLS system. This affects the quality of water outputted by the WLS because it will vary with the composition of the recycled water. Thus, a larger portion of the WLS output will need increased level of treatment through the downstream after filters and weak acid cation exchanger. To handle the demand of the recycled water, fresh water, and produced water, the WLS will need to constantly run at capacity. However, even though the WLS is running at capacity, a smaller amount of water is usable by the steam generator, with the rest being recycled again. Further, constantly running at capacity also means that the WLS will require higher maintenance costs. Finally, there is a bottleneck at the WLS for the produced water because a certain volume in the WLS is recycled water that also needs treatment.

Figure 2:
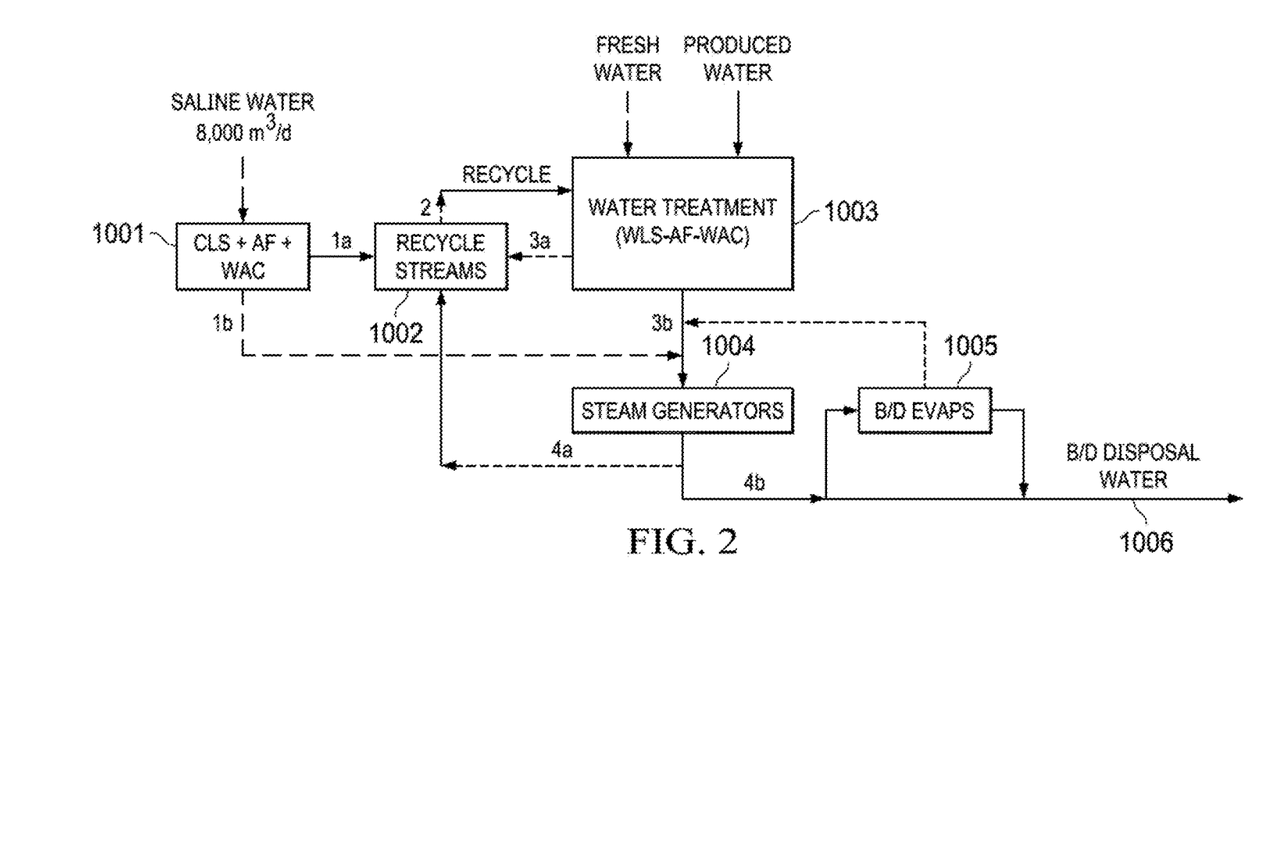
FIG. 2. Simplified schematic of a typical water treatment operation for SAGD.

The present invention, one embodiment of which is shown in FIG. 2, overcomes one or more of these issues by redirecting the generated or recycled water away from the WLS. As shown in FIG. 2, the fresh water (101) and recycle stream (20) is now introduced into the CLS system (2001). This redirection reduces the burden on the WLS (2003), which is the main water treatment system. Thus, the WLS (2003) is able to treat and output a much larger volume of produced water usable by the steam generator (2004), which translates into improved hydrocarbon recovery. Further, by recycling the blowdown (40a) to the CLS, the amount of disposal water can be reduced. Essentially, all of the waste streams generated by the filter backwash, weak acid cation exchanger resin regeneration, and boiler blowdown is re-routed to the CLS in current system.

The remaining systems in the water treatment operation remain the same in FIG. 2. Thus, for existing SAGD operations, a minimum amount of rerouting is needed to implement the currently disclosed configuration. Further, the same steam generators and WLS or HLS can be used.

Adding the recycle stream (20) to the CLS (2001) provides a number of benefits. First, the recycle stream (20) is at a higher temperature than the CLS system due to the presence of the steam generator's blow down (40A). The temperature of the stream will raise the overall temperature of the CLS (2001). A higher operating temperature, even by a few degrees, will reduce the chemical requirement of the CLS because the rate of reaction increases and the pH level needed to precipitate hardness decrease, leading to an increase in harness precipitation. The CLS outlet hardness is also expected to decrease to about 30-40 mg/L as opposed to the typical 50-60 mg/L. Not only does this decrease signify less wear on the equipment, but a lower hardness outlet translates into less chemical loading in the WAC portion of the system. Finally, the blowdown stream (40b) also has a high pH (pH-12) and free caustic, which will lower the caustic requirement for the CLS.

A number of issues were addressed during the design of the presently described configuration.

Constant temperature: Uniform temperature feed is important for CLS performance because temperature swings of more than 1° C./hr can result in solids carryover. As the recycled stream (20) is at a higher temperature because of the steam generator blowdown and a new fresh water stream (101) will be introduced into the CLS, a method of maintaining temperature was needed. Although the method works at ambient temperatures of ~5° C., the increased temperatures from the recycle stream improves the method.

After much trial and error, Applicant decided on the use of a mixing vessel external to the CLS. Due to the simplicity of the operation design in FIG. 2, this mixing is not shown. However, it will be located outside the CLS (2001).

The recycle stream (20), saline stream (102), and fresh water (101) will be fed at constant ratios into the mixing vessel and thoroughly mixed before entry into the CLS vessels (2001). This will not only ensure a constant temperature, but the fixed ratio feature will also maintain a relatively constant water chemistry. A constant water chemistry means that the CLS and weak acid cation exchanger systems are tested infrequently and the added amount of chemicals does not fluctuate.

TOC and Silica: The steam generator's blowdown stream contains organics and dissolved silica. These contaminants are not expected to be an issue since they were not an issue for the WLS, but their impact could potentially be significant. Thus, laboratory tests were performed to determine the effect, if any, of the total organic content (TOC) and silica on the CLS system. No significant issues were identified.

Example 1: Alberta Project

The Applicant operates an in-situ SAGD bitumen oil sands project in Alberta, Canada (hereinafter referred to as the "Alberta Project") that was experiencing a bottleneck at the WLS. To reduce this bottleneck, two scenarios using the disclosed water treatment system configuration was tested for their ability to increase throughput of the CLS and blend multiple process streams with this makeup water system without adversely affecting the steam generation.

Figure 3:
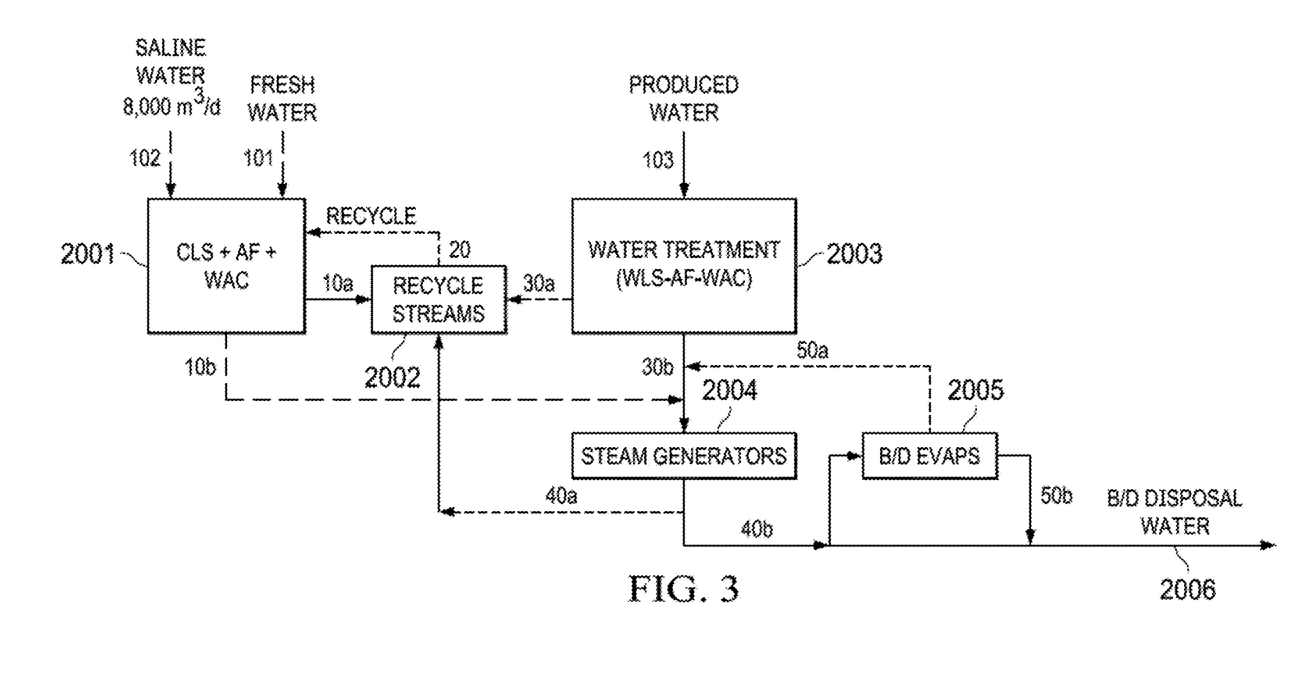
FIG. 3. Simplified schematic of one embodiment of the presently disclosed invention.
Figure 4:
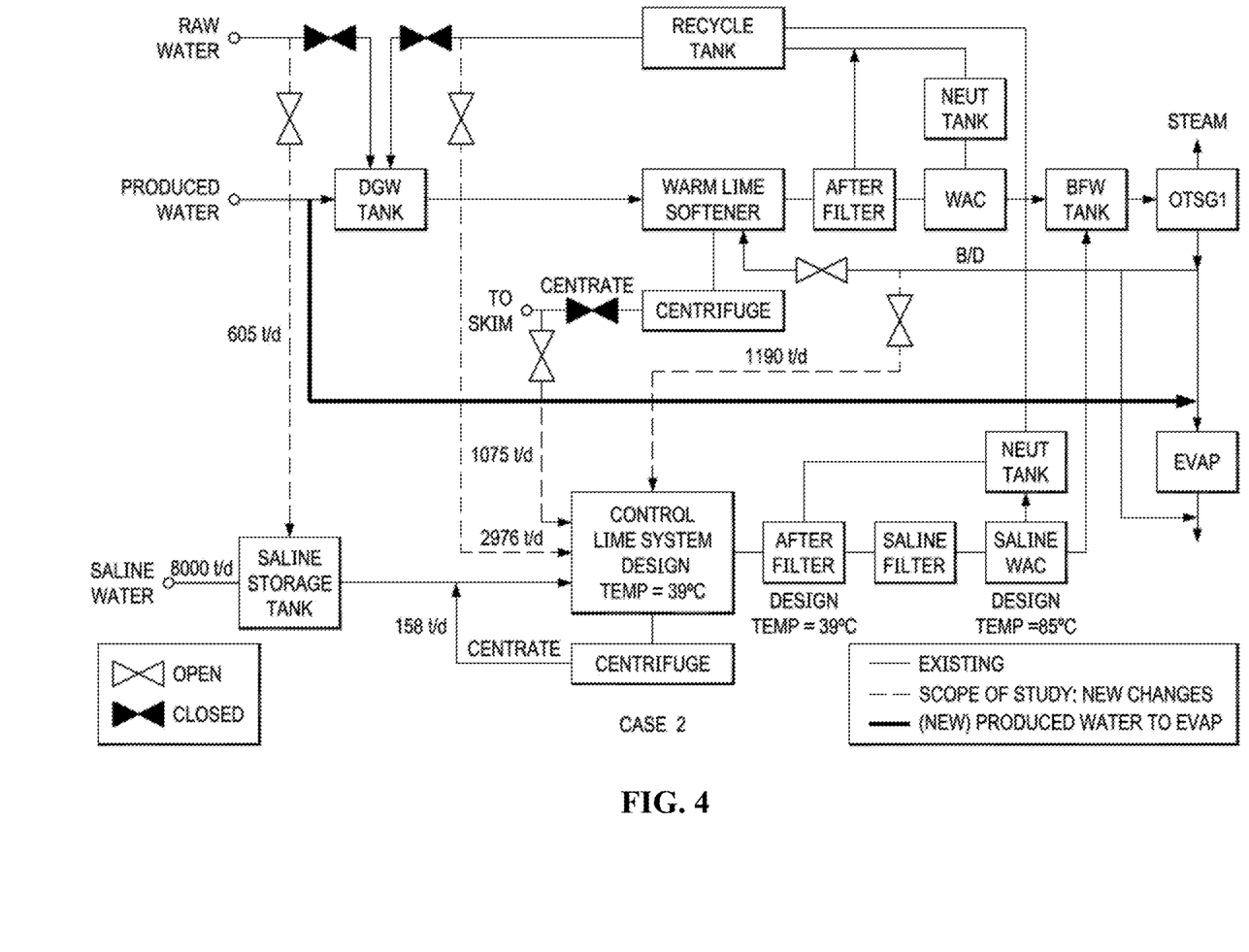
FIG. 4. Simplified schematic of case study 2 and 3 of the Alberta Project.

In both case studies, the fresh water, OTSG blowdown, recycle tank and centrate streams from the lime softening systems were combined and treated with the CLS, as shown in FIG. 3. In FIG. 3, the new changes to the water treatment system at the Alberta Project are shown in dashed lines and the new streams to the evaporator are shown in bold lines. The saline water flow rate was the same for both studies and the inlet CLS temperature was expected to increase to 30° C. However, the inlet flow rate of CLS was different for both studies. Thus, "Case Study 2" has a smaller volume of stream flowing into the CLS than "Case Study 3".

Table 1 displays the flow rates for Case study 2 and 3, and composition of the ions in the water streams combined in both case studies.

TABLE 1

Composition and Flowrates for Case 2 and 3, Alberta Project

| Properties | | Fresh | Saline | Blow-down | Recycle Tank | CLS Centrate | WLS Centrate |
|---|---|---|---|---|---|---|---|
| Case 2 Flowrates | | | | | | | |
| Normalized Flowrate | t/d | 601 | 8,000 | 1,190 | 2,976 | 158 | 1,075 |
| Temperature | ° C. | 5 | 5 | 80 | 68 | 30 | 79 |
| Case 3 Flowrates | | | | | | | |
| Normalized Flowrate | t/d | 2,091 | 8,000 | 1,700 | 2,976 | 158 | 1,075 |
| Temperature | ° C. | 5 | 5 | 80 | 68 | 30 | 79 |
| Cations | | | | | | | |
| Calcium ($Ca^{2+}$) | mg/L as ion | 1.9 | 53 | 0.2 | 342.9 | 15.0 | 10.5 |
| Magnesium ($Mg^{2+}$) | mg/L as ion | 1 | 37 | 0.2 | 68.8 | 3.0 | 2.1 |
| Sodium ($Na^+$) | mg/L as ion | 546 | 3,054 | 7,296 | 1,465 | 3,063 | 987 |
| Potassium ($K^+$) | mg/L as ion | 1.9 | 11.7 | 157 | 29 | 12 | 33.2 |
| Ferrous Iron ($Fe^{2+}$) | mg/L as ion | 4.5 | 0.4 | 0.9 | 0.2 | 0.3 | 0.1 |
| Ferric Iron ($Fe^{3+}$) | mg/L as ion | 0.0 | 0.0 | 0.0 | 0.0 | 0.0 | 0.0 |
| Manganese ($Mn^{2+}$) | mg/L as ion | 0.3 | 0.0 | 0.0 | 0.0 | 0.0 | 0.0 |
| Barium ($Ba^{2+}$) | mg/L as ion | 0.1 | 0.7 | 0.8 | 0.2 | 0.7 | 0.0 |
| Strontium ($Sr^{2+}$) | mg/L as ion | 0.1 | 4.4 | 5.2 | 1.2 | 4.4 | 0.2 |
| Anions | | | | | | | |
| Carbonic Acid ($H_2CO_3$) | mg/L as ion | 5.8 | 5.7 | 0.0 | 0.0 | 0.0 | 0.0 |
| Bicarbonate ($HCO_3^-$) | mg/L as ion | 984 | 495 | 14.2 | 32.1 | 0.0 | 0 |
| Carbonate ($CO_3^{2-}$) | mg/L as ion | 19.6 | 5.0 | 63.4 | 18.1 | 73.7 | 65.0 |
| TIC | mg/L as C | 198.8 | 99.6 | 15.5 | 9.9 | 0.0 | 13.0 |
| Chloride ($Cl^-$) | mg/L as ion | 313 | 4,708 | 10,492 | 2,121 | 4,697 | 1,349 |
| Sulfate ($SO_4^{2-}$) | mg/L as ion | 22.4 | 74 | 119.5 | 25.2 | 73.8 | 10.9 |
| Additional Parameters | | | | | | | |
| Total Hardness | mg/L as $CaCO_3$ | 9 | 284 | 1.4 | 1139.2 | 50.0 | 35 |
| TDS | mg/L as ion | 1,904 | 8,450 | 18,317 | 4,136 | 7,950 | 2,506 |
| Silica (Reactive) | mg/L as $SiO_2$ | 8 | 6.7 | 154.2 | 28.1 | 6.8 | 35 |
| $OH^-$ | mol/L | 5.0E−06 | 2.0E−06 | 2.3E−03 | 1.9E−04 | 7.9E−04 | 2.0E−04 |
| pH at 25° C. | | 8.7 | 8.3 | 11.4 | 10.3 | 10.9 | 10.3 |
| TSS | mg/L | 0 | 0 | 0.0 | 58.1 | 0 | 0 |

Thus, the main difference between Case study 2 and 3 was the blend ratios of the various process streams, as shown in Table 1.

The initial process water streams for both case studies were analyzed to develop a chemical treatment strategy for the modified water treatment system. This characterization revealed the largest contributor to Total Hardness among the process streams was associated with the weak acid cation exchanger regeneration stream. Thus, only the weak acid cation exchanger regeneration stream was used to comprise the recycle tank stream, which would represent worst-case Total Hardness conditions.

The initial analysis also revealed that reactive silica near or above the maximum effluent concentration was also primarily restricted to the weak acid cation exchanger regeneration and OSTG streams. However, based upon the blend ratio for both Case 2 and 3, reactive silica was not expected to go over the maximum and was not considered an issue. The WLS centrate stream also appeared to contain a notable amount of turbidity, while a notable amount was detected in the weak acid cation exchanger regeneration streams.

Jar testing was also performed to simulate the solids contact process treatment via batch tests to evaluate chemical dosing requirements utilizing lime ($Ca(OH)_2$) and soda ash ($Na_2CO_3$), followed by coagulation (e.g. ferric chloride, organic coagulants including polyDADMAC and epi-DMA) in conjunction with a polymeric flocculant aid. Theoretical sludge production and laboratory settling rates were also measured to assess clarifier rise-rate performance, as it would relate to solids concentration. The effluent objectives identified from the laboratory feasibility studies were:

Total Hardness less than 40 mg/L as $CaCO_3$
Reactive Silica less than 50 mg/L as $SiO_2$
Identification of any unforeseen or fatal-flaw scenarios with the Case Study 2 and 3 blends During the case studies, blended water samples were collected to characterize the treatment program. The data was then compiled into a "snapshot" of the influent water quality at the time of collection. Only parameters specific to the targeted influent design criteria and effluent treatment objectives are considered throughout the treatability study. Table 2 displays the results for one such snapshot, where the data from actual collected samples was compared with the theoretical data from the initial analysis and jar tests.

TABLE 2

Pertinent Routine Results

| Analytical Parameter | Units | Case 2 Theoretical | Case 2 Actual | Case 3 Theoretical | Case 3 Actual |
|---|---|---|---|---|---|
| pH | S. U. | 8.54 | 9.24 | 8.67 | 9.36 |
| M-Alkalinity | mg/L as $CaCO_3$ | 771 | 600 | 872 | 740 |
| P-Alkalinity | mg/L as $CaCO_3$ | 176 | 180 | 218 | 240 |
| Turbidity | NTU | 178 | 185 | 156 | 189 |
| Whatman 2 Filtered Turbidity | NTU | 4.25 | 1.41 | 3.76 | 5.65 |
| Free Carbon Dioxide | mg/L | 0 | 0 | 0 | 0 |
| Total Hardness | mg/L as $CaCO_3$ | 736 | 780 | 647 | 660 |
| Calcium | mg/L as $CaCO_3$ | 492 | 500 | 432 | 460 |
| Magnesium | mg/L as $CaCO_3$ | 244 | 280 | 214 | 200 |
| Reactive Silica | mg/L | 28 | 34.8 | 31 | 27.6 |

Analysis of the blended samples in the snapshot in Table 2 showed relatively good agreement between theoretical and actual quantified results, though alkalinity appears a little low. Reactive silica was also determined to be less than 50 mg/L in the fresh water, thus no further treatment was required as the concentration was already below the effluent treatment objective. However, the appropriate dosing for hardness treatment was analyzed in depth for both case studies.

For both case studies, jar tests were performed to monitor and/or adjust the requirements for the chemicals used in the CLS. Jar tests are pilot-scale tests used to identify and select treatment chemicals. The test can simulate the coagulation/flocculation process in a water treatment plant and helps determine if the right amount or type of chemicals are being used and the sequence in which the chemicals should be added. The results of these jar tests are described in more detail below.

Case Study 2 Results.

A number of jar tests were performed for Case study 2 to determine how best to chemically treat the combined water stream in the CLS. With only 8.5% boiler blowdown in the blend ratio, the temperature of the CLS increased to 30° C. This operating temperature was used for estimating the chemical dosing levels.

First, a series of jar tests were performed to determine the lime and soda ash dosages. The initial pH screen was used to determine the lime dosage necessary to achieve maximum magnesium hardness removal for the Case study 2 blend. Lime dosages ranging from 260 to 660 mg/L followed by 25 mg/L ferric chloride and 1.0 mg/L of the polyflocculant GE Betz AE1703 were screened using jar tests. Notably, a lime dosage of 660 mg/L at a pH of 11.26 was not able to reach complete precipitation of magnesium hardness, despite being within the acceptable excess hydroxide pH conditions.

Testing then continued to screen soda ash dosages ranging from 200 to 600 mg/L, along with an elevated lime dosages (700 mg/L) followed by 25 mg/L ferric chloride and 1.0 mg/L of GE Betz AE1703. When considering that there is both a carbonate and non-carbonate component for the fresh water (i.e. Total Hardness is greater than Total Alkalinity), stoichiometric calculations suggested an anticipated lime and soda ash dosage in upwards of 702 mg/L and 191 mg/L, respectively. However, jar test results appeared to indicate that a minimum soda ash dosage of 600 mg/L and 700 mg/L lime would possibly be sufficient when employing sludge recycling and taking advantage of enhanced precipitation kinetics associated with solids contact.

Sludge recycling was also performed using a jar test, beginning with 600 mg/L of soda ash followed by 700 mg/L of lime. Difficulty in achieving effluent clarity became apparent with the modification and process treatment was abandoned by the fifth recycle, which resulted in a final effluent clarity of 153 NTU and Total Hardness of 50 mg/L as $CaCO_3$.

In view of the difficulty with the effluent turbidity, additional testing was carried out to optimize an organic coagulant (Nalco 8103$^+$ polyDADMAC) instead of ferric chloride in the hardness removal. Adjustments to treatment chemistry were made and upon the final recycle, a soda ash dosage of 1,300 mg/L and 900 mg/L lime followed by 375 mg/L of Nalco 8103$^+$ and 4.0 mg/L of GE Betz AE1703 was able to yield 40 mg/L Total Hardness as $CaCO_3$. The final effluent turbidity was 33.2 Nephelometric Turbidity Units or "NTU" and represented a 78% reduction from previous testing in jar test.

These test results demonstrated that an organic coagulant, albeit at a high dosage, was much more effective with regards to effluent clarity than ferric chloride. The high charge demand associated with the fresh water suits an organic coagulant option. Inorganic coagulants, as the tests have shown, could potentially be less effective and require higher dosages, resulting in unfavorable sludge quality.

In addition to tests monitoring and adjusting the CLS treatment, the sludge solids were also tested. Sludge solids collected from the solids recycling unit were subjected to settling tests to evaluate solids concentrations as it relates to clarifier performance.

The settling test results demonstrated that hindered settling was reached when approaching maximum reactor solids concentration (20,000 mg/L). Typically, laboratory settling rates are 3-5 times less than what can be achieved in the field due to the inability to mimic clarifier dynamics in batch jar tests. The calculated sludge solids for this case study condition primarily consisted of calcium carbonate (~86%), magnesium hydroxide (~8%), and indigenous TSS (~6%). However, given the percentage of OSTG (8.5%) and corresponding level of TOC contributed in the fresh water make-up, it is likely that flocculant settling rate will be impacted as evident by the lower flocculant settling rates when compared to saline water alone. Based on these laboratory settling tests results, the lower end of standard rise rates (e.g. 8 GPM/ft$^2$) of the settling tank on the CLS, e.g., a DensaDeg® Clarifier, is likely achievable for this Case Study 2 application.

Figure 5:
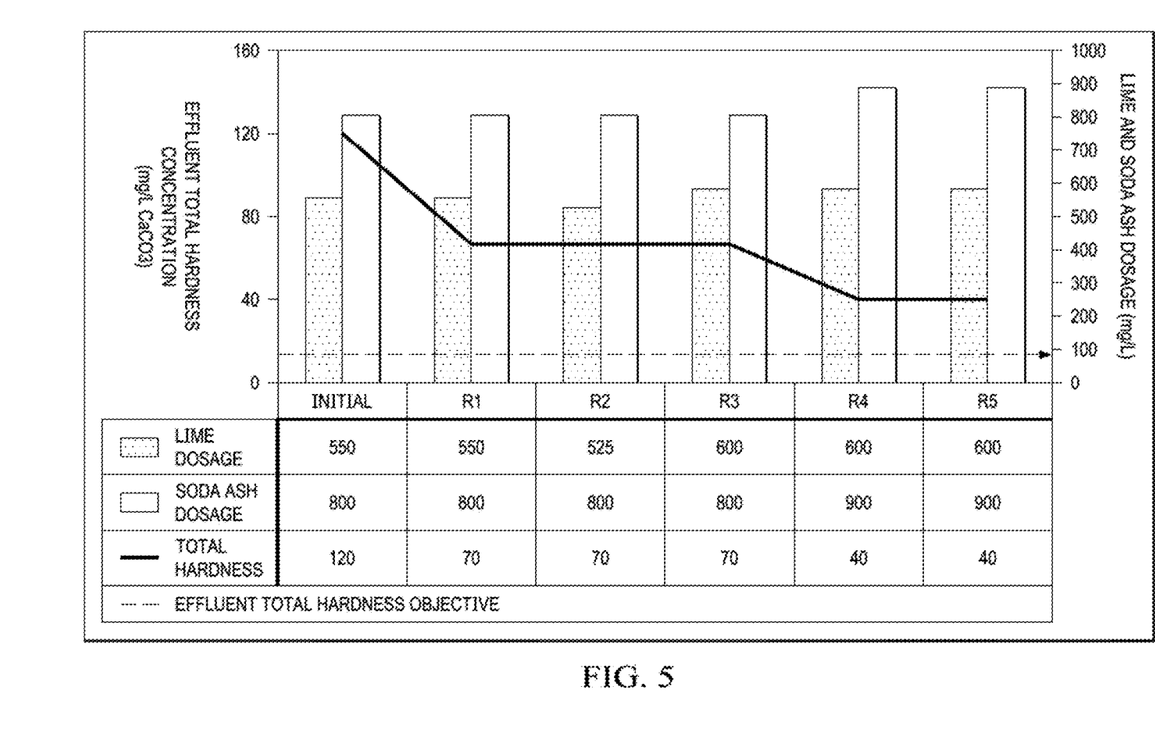
FIG. 5 displays the total hardness concentration in case study 2 for lower dose lime and soda ash.

In view of the results using a lime dosage of 900 mg/L and a soda ash dosage of 1,300 mg/L, a lower chemical dosage was also tested and the results are shown in FIG. 5. Lower chemical dosages of soda ash dosage (800 mg/L) and lime (550 mg/L) were initially fed into the system followed by 300 mg/L of Nalco 8799+ polyDADMAC and 4.0 mg/L GE Betz AE1703 flocculant aid, before being increased to 900 mg/l and 600 mg/L, respectively. Nalco 8799+ was chosen because preliminary screening had shown a favorable response with regards to flocculant agglomeration. Sludge recycling was also implemented to further enhance total hardness and solids removal. Upon completion of the final recycle using this lower dosage, feeding 900 mg/L of soda ash followed by 600 mg/L lime resulted in effluent Total Hardness of 40 mg/L as CaCO$_3$ and an effluent turbidity of was 51.5 NTU. The flocculant exhibited fair agglomeration and settling characteristics.

From these series of tests and modifications to the chemical treatment in Case study 2, a 1,300 mg/L dose of soda ash followed by 900 mg/L of lime employing sludge recycling and a high dose of Nalco 8103+ polyDADMAC (375 mg/L) in conjunction with 4.0 mg/L GE Betz AE1703 was found to be an effective chemical treatment regime under the design temperature conditions (30° C.). Most notably was improvement of effluent clarity when switching to an organic coagulant. Further, laboratory sludge settling rates indicated floccuant may favor a more conservative DensaDeg® Clarifier design rise rates of 8 GPM/ft$^2$ under design temperature conditions of 30° C. Given that calculated sludge composition estimates calcium carbonate at 91% and that magnesium hydroxide (~9%) occupies a lower percentage, it appears the overall makeup of this case study blend may play a role in yielding reduced solids settling rates.

Once the chemical dosage was optimized, the CLS was able to successfully treat the new water blend and remove some of the workload from the WLS. This, in turn, allowed for a larger amount of produced water to be treated and reused in steam generation.

Case Study 3 Results.

Similar to Case study 2, jar tests were performed on the water streams to determine the appropriate chemical dosage for the higher flow rate. Analysis of the Case Study 3 fresh water concluded that total hardness was believed to be associated with carbonate hardness given that total alkalinity was greater than total hardness. Stoichiometric calculations suggested the anticipated lime dosage would be in upwards of 743 mg/L and a pH screen was used to narrow the lime dosage necessary to achieve maximum magnesium hardness removal for the Case Study 3 blend. In view of these results, the lime dosages screened for Case Study 3 ranged from 300 to 1,100 mg/L (targeting pH set-points of 10, 10.5, and 11.2) followed by 25 mg/L ferric chloride and 1.0 mg/L of GE Betz AE1703. A lime dosage of 1,100 mg/L at a pH of 11.45 was able to reach complete precipitation of magnesium hardness.

The soda ash dosages ranging from 200 to 1,200 mg/L along with 1,100 mg/L lime followed by 25 mg/L ferric chloride and 1.0 mg/L of GE Betz AE1703 were also tested. It was initially believed that a minimum soda ash dosage of 700 mg/L would possibly meet the total hardness objective when employing sludge recycling. Therefore, sludge recycling was performed beginning with 700 mg/L of soda ash followed by 1,100 mg/L of lime. At this dosage, the jar tests experienced difficulty in achieving effluent clarity. Adjustments were made feeding BASF LT7995 polyDADMAC in upwards of 80 mg/L along with 25 mg/L of ferric chloride in an attempt to improve the clarity. By the tenth recycle, effluent clarity had reached 597 NTU with a total hardness of 60 mg/L as CaCO$_3$.

Given this difficulty with effluent turbidity, which was also seen in Case study 2, and the increase in Total Hardness, further testing was carried out utilizing another organic coagulant (Nalco 8103+ polyDADMAC). Upon the final recycle, a soda ash dosage of 1,300 mg/L and 1,100 mg/L lime followed by 400 mg/L Nalco 8103+ and 4.0 mg/L GE Betz AE1703 was able to yield 32 mg/L Total Hardness as CaCO$_3$. It is worth noting that in the previous tests, Total Hardness was reduced to 40 mg/L CaCO$_3$ with a lower lime dosage (800 mg/L) during solids recycling.

There was also a notable improvement in the effluent turbidity with the use of a polyDADMAC coagulant resulting in a final effluent turbidity of 35.3 NTU. However, Case Study 3 seems to exert more coagulant demand than Case Study 2, as evident by the increase in the polyDADMAC dosage.

Sludge solids collected from the solids recycling unit were also subjected to settling tests to evaluate solids concentrations as it relates to clarifier performance. Only a limited volume of sludge was available for performing settling tests. The settling test results appear to show a similar trend that hindered settling will be reached when approaching maximum reactor solids concentration. The estimated sludge solids at this concentration will primarily exist as calcium carbonate (~90%), magnesium hydroxide (~6%), and (~5%) indigenous TSS.

Even though higher settling rates were noted for this case study, the available volume tested was minimal and may have biased results. More importantly, given the sludge make-up overall contains less magnesium, the higher settling rates for mid-range and lower solids concentration are believed to be reflective of the greater percentage of calcium carbonate. Therefore, settling tests results appear to indicate that standard DensaDeg® Clarifier rise rates (8-12 GPM/ft$^2$) are likely achievable for this Case Study 3 application.

Thus, a 1,300 mg/L dose of soda ash followed by 1,100 mg/L of lime employing sludge recycling and a high dose of Nalco 8103+ polyDADMAC (400 mg/L) in conjunction with 4.0 mg/L GE Betz AE1703 was an effective chemical treatment regime under design temperature conditions (30° C.) for the higher flow rate in Case study 3. Once again, effluent clarity was notably improved when switching to an organic coagulant. Laboratory sludge settling rates also indicated flocculants favor typical DensaDeg® Clarifier design rise rates of 8-12 GPM/ft² at design temperature conditions (30° C.) when considering calculated sludge composition estimates of calcium carbonate at ~96% and magnesium hydroxide at ~4%. The amount of chemicals consumed in the CLS with the added heat from the recycle stream is 20-30% less than a CLS method without the added heat.

From both case studies, it can be concluded that the new design for the CLS not only removed some of the burden placed on the WLS and decreased the bottlenecking issues, but also improved saline water quality. Other systems can be optimized as described above.

While chemical dosings will have to be determined and adjusted for other SAGD sites to achieve the same results seen here, Case studies 2 and 3 show that it is possible to decrease the hardness (both calcium and magnesium) and turbidity using a CLS.

The following references are incorporated by reference in their entirety.

Butler, R. M., "Thermal Recovery of Oil & Bitumen", Chapter 7: "Steam-Assisted Gravity Drainage", Prentice Hall, (1991).

The invention claimed is:

1. A water treatment system for SAGD comprising:
a) a saline water stream;
b) a fresh water stream,
c) a produced water stream;
d) a warm lime softener treatment unit comprising a warm lime softener system fluidly connected to a first ion exchange system, which is fluidly connected to at least one filter, said warm lime softener unit having an inlet for receiving and treating said produced water stream, a chemical injection inlet for receiving softening chemicals, a first outlet for a treated produced water stream, and a second outlet for a first regeneration stream;
e) a cold lime softener treatment unit comprising a cold lime softener system fluidly connected to a second ion exchange system, which is fluidly connected to at least one filter, said cold lime softener unit having a cold lime softener inlet, a chemical injection inlet for receiving softening chemicals, a first outlet for a first treated water stream, and a second outlet for a second regeneration stream;
f) one or more steam generators fluidly connected to said first outlet of said warm lime softener treatment unit and said first outlet of said cold lime softener treatment unit such that said steam generators receive and heat said first treated water stream and said treated produced water stream, said steam generators having a first outlet for steam and a second outlet for a blowdown stream; and,
g) a vessel fluidly connected to said second outlet of said warm lime softener treatment unit, said second outlet of said cold lime softener treatment unit, and second outlet of said steam generators, such that said vessel mixes said saline water stream, said fresh water stream, said first regeneration stream, said second regeneration stream, and said blowdown stream to form a stream to be treated, said vessel in fluid communication with said cold lime softener inlet, wherein the stream to be treated is received by said cold lime softener inlet in said cold lime softener treatment unit for treatment by said cold lime softener treatment unit.

2. The system in claim 1, wherein said blowdown stream in said stream to be treated raises the temperature and pH of said cold lime softener treatment unit as compared to cold lime softener treatment units that do not use a blowdown stream.

3. The system in claim 2, wherein the raise in temperature is 5-50° C.

4. The system in claim 2, wherein said blowdown stream in said stream to be treated raises the temperature of said cold lime softener treatment unit to 30° C.

5. The system in claim 2, wherein the raise in temperature and pH reduces the amount of softening chemicals required for treatment by the cold lime softener treatment unit by at least 20%.

6. The system in claim 1, wherein said first ion exchange system and said second ion exchange system each comprises a weak acid cation exchanger.

7. The system in claim 1, wherein said stream to be treated has a constant, known ratio of saline water stream, fresh water, first regeneration stream, second regeneration stream, and blowdown stream.

8. A method for treating feedwater for a steam generator, comprising:
a) treating a produced water stream with a warm lime softener treatment unit to make a treated produced water;
b) mixing a saline water, a makeup water and a steam generator blowdown stream in a vessel to form a combined stream;
c) treating said combined stream with a cold limewater stream in a cold lime softener treatment unit, wherein said steam generator blowdown stream increases the operating temperature and pH of said combined stream resulting in less cold limewater being used to make a treated combined stream as compared with cold lime softener treatment units that do not treat blowdown streams;
d) combining said treated produced water with said treated combined stream to form a feedwater for a steam generator.

9. The method of claim 8, wherein said treating said combined stream with a cold limewater stream in a cold lime softener treatment unit comprises an organic coagulant.

10. The method of claim 9, wherein said organic coagulant is a poly(diallyldimethylammonium chloride).

11. The method of claim 8, further comprising the steps of generating steam from said feedwater, injecting said steam into an oil well, producing oil and a condensed steam, separating out said condensed steam to form a produced water, and repeating steps a)-d) for said produced water.

12. An improved water treatment method for SAGD, wherein said water treatment method comprises treating produced water, fresh water, blowdown water, and regeneration water with a warm lime softener treatment unit to produce a first treated water stream, treating saline water with a cold lime softener treatment unit to produce a second treated water stream, generating steam from said first and second treated water streams with at least one steam generator, the improvement comprising feeding said fresh water, said blowdown water, said regeneration water, and said saline water to a vessel and mixing to form a first mixture, and treating said first mixture in said cold lime softener treatment unit, wherein the warm lime softener treatment unit only treats said produced water.

13. The system in claim 12, wherein said first mixture has a predetermined ratio of fresh, blowdown, regeneration, and saline water, wherein said predetermined ratio is maintained.

14. The system in claim 12, wherein said improvement further comprises said warm lime softener treatment unit treating larger volumes of produced water than a method wherein a warm lime softener treatment unit treats produced water, fresh water, blowdown water, and regeneration water.

15. A method for treating saline water for SAGD operations, comprising:
a) mixing a saline water stream with a warm steam generator blowdown stream, a warm lime softener regeneration stream, a cold lime softener regeneration stream and a fresh water stream in a vessel at a known and constant ratio to form a mixture;
b) introducing said mixture into a cold lime softener unit, said cold lime softener unit comprising a cold lime softener, a first ion exchanger, and at least one filter in fluid communication, wherein said cold lime softener unit has an outlet for a regeneration stream, an inlet for said mixture, and an inlet for softening chemicals;
c) mixing said mixture with said softening chemicals in said cold lime softener to form a softened mixture, wherein the operation temperature and pH of said cold lime softener is raised by said warm steam generator blowdown stream, wherein said increase in temperature and pH increases the reaction rate of said softening chemicals such that the amount of softening chemicals needed for treatment is reduced;
d) treating the softened mixture with a second ion exchanger and at least one filter to form a treated saline water stream;
e) feeding said treated saline water stream into a steam generator; and
f) wherein said warm steam generator blowdown stream in step a) comes from said steam generator in step e).

16. The method of claim 15, wherein said cold lime softener regeneration stream comes from said regeneration stream outlet of said a cold lime softener unit.

17. The method of claim 15, wherein said first ion exchanger and said second ion exchanger each comprises a weak acid cation exchange mechanism.

18. The method of claim 15, wherein said increase in temperature and pH reduces the amount of cold limewater by 20%.

19. The method of claim 15, wherein said treated saline water stream is mixed with a treated produced water stream before being fed into said steam generator.

20. The method of claim 15, wherein said softening chemicals comprises an organic coagulant.

* * * * *